United States Patent [19]

Kirby et al.

[11] Patent Number: 5,318,242
[45] Date of Patent: * Jun. 7, 1994

[54] CLOSED FACE FISHING REEL HAVING CONE WITH REPLACEABLE LINE CHOKE

[75] Inventors: Thomas G. Kirby, Broken Arrow; Robert J. Peterson, Claremore, both of Okla.

[73] Assignee: Swede Industries, Inc., Claremore, Okla.

[ * ] Notice: The portion of the term of this patent subsequent to Oct. 9, 2007 has been disclaimed.

[21] Appl. No.: 31,030

[22] Filed: Mar. 11, 1993

Related U.S. Application Data

[63] Continuation of Ser. No. 595,100, Oct. 9, 1990, abandoned, which is a continuation-in-part of Ser. No. 365,256, Jun. 12, 1989, Pat. No. 4,961,547.

[51] Int. Cl.$^5$ .............................................. A01K 89/01
[52] U.S. Cl. .................................................... 242/238
[58] Field of Search ............... 242/234, 235, 236, 237, 242/238, 239, 240, 311, 319

[56] References Cited

U.S. PATENT DOCUMENTS

| | | | |
|---|---|---|---|
| 3,028,115 | 4/1962 | Hammer | 242/240 |
| 3,185,405 | 5/1965 | Hull | 242/240 |
| 3,697,011 | 10/1972 | Christensen et al. | 242/240 X |
| 4,448,367 | 5/1984 | Puryear | 242/239 |
| 4,722,491 | 2/1988 | Myojo | 242/311 |
| 4,961,547 | 10/1990 | Peterson et al. | 242/238 |

*Primary Examiner*—Daniel P. Stodola
*Assistant Examiner*—John P. Darling
*Attorney, Agent, or Firm*—Head & Johnson

[57] ABSTRACT

A closed face fishing reel assembly having a body, which is attachable to a fishing rod, a spool supported to the body, a winding drum rotatably supported at the forward end of the spool which may be rotated for winding line onto the spool and which may be axially advanced, a cone supported to the body forwardly of the spool, and a winding drum having a passageway therethrough, the internal shape of which defines a line confining envelope, the cone is either the outer housing or in one embodiment a separate housing is secured to the body and encompasses the spool, winding drum and cone, and a fishing line received through a the cone passageway and
at least partially wound on the spool, the configuration of the body being independent of the line confining envelope provided by the cone, the cone or the housing includes a replaceable line choke for controlling casting distance and/or velocity.

16 Claims, 3 Drawing Sheets

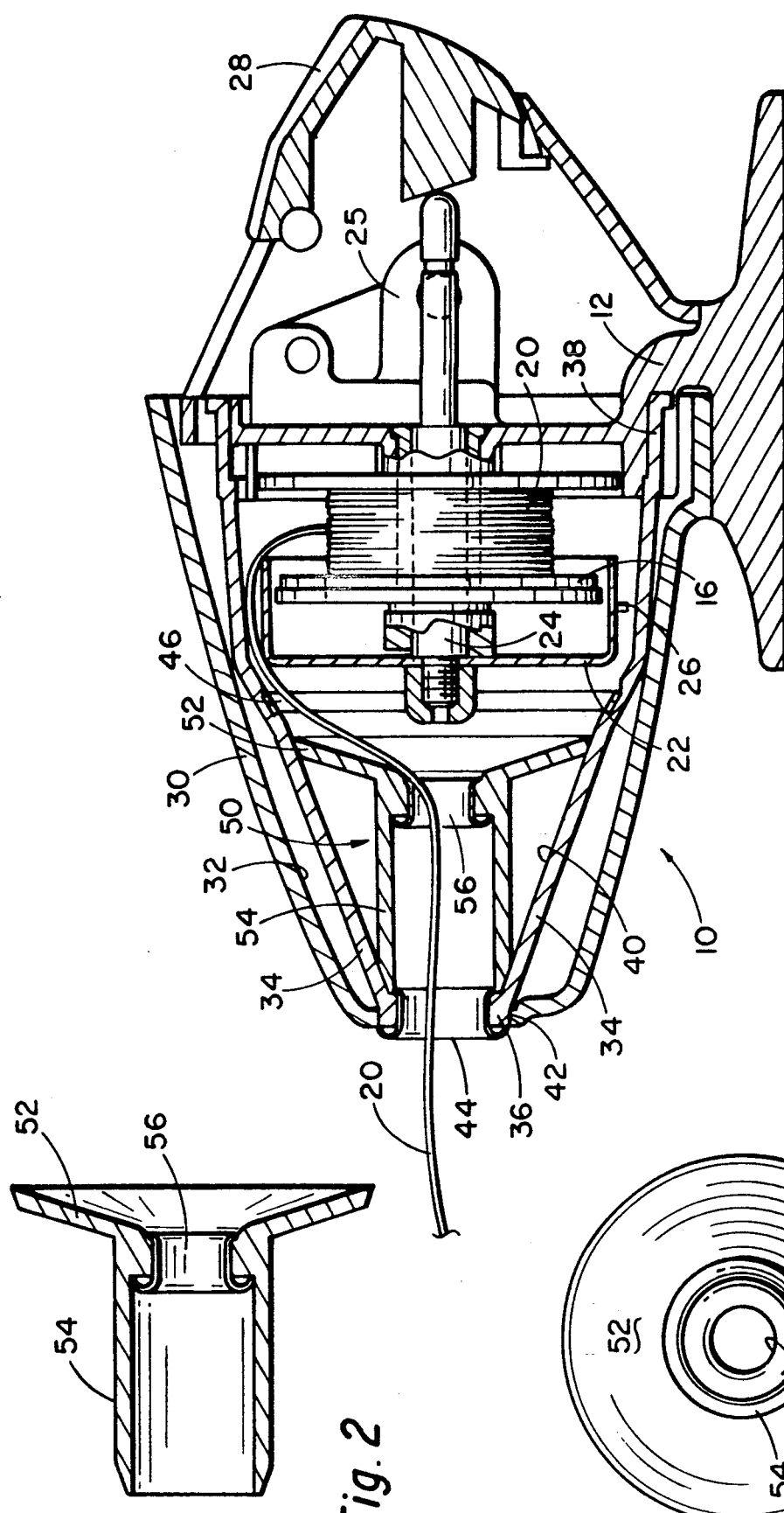

CLOSED FACE FISHING REEL HAVING CONE WITH REPLACEABLE LINE CHOKE

RELATED PATENTS

This is a continuation of copending application Ser. No. 07/595,100, filed on Oct. 9, 1990, now abandoned, which is a continuation-in-part of copending U.S. application Ser. No. 07/365,256, filed Jun. 12, 1989, and now U.S. Pat. No. 4,961,547, Oct. 9, 1990, which is incorporated herein by reference.

A very popular item with fishermen is the closed face fishing reel. This type of reel includes a body having a spool mounted thereto and a winding drum rotatable relative to the spool. By means of a crank and a gearing mechanism, the winding drum is rotated. A line engaging element is extendable from the winding drum to catch a line and wind the line on the spool as the winding drum is rotated. The closed face fishing reels presently available on the market typically include a housing which is secured to the reel body and encompasses the spool and winding drum and the gearing mechanism. The housing body closely fits the spool and winding drum in the forward part of the housing body and has an interior surface which defines a line confining envelope. The shape of this line confining envelope determines, at least in part, the characteristics of the reel and particularly, the characteristics of the discharge of line from the reel when a fishing bait is cast.

For reference to others who have provided closed face fishing reels, reference may be had to the following U.S. patents: Winans et al U.S. Pat. No. 161,314; Miller U.S. Pat. No. 2,034,917; Forestiere, Sr. U.S. Pat. No. 2,399,863; Palmer U.S. Pat. No. 2,600,259; Hull U.S. Pat. No. 2,929,578; Johnson U.S. Pat. No. 2,932,465; Puryear U.S. Pat. No. 4,448,367; and Myojo U.S. Pat. No. 4,722,491.

In each case these prior art references include concepts wherein the internal surface of the forward portion of the housing defines the line confining envelope. Thus, in these prior art devices the external appearance of the fishing reel is determined in part by the required line confining envelope.

The present invention is directed towards an improvement in closed face fishing reels in which the line defining envelope is independent of the reel housing. This feature allows the design of the fishing reel to have a more aesthetically pleasing housing without sacrificing reel performance characteristics.

In another arrangement, the invention provides a reel in which the line confining envelope of the reel is independent of the housing, and thereby permits changing the line confining envelope geometry while retaining the same housing geometry.

Another object of the invention is to provide a closed face fishing reel having a housing and/or a line confining envelope of the type taught in the aforesaid U.S. Pat. No. 4,961,547, including a removable and replaceable line choke means for changing the characteristics, i.e. velocity and distance of the line and lure that is cast.

The closed face fishing reel of this invention includes a reel body and means for attachment to a fishing rod, the body having a forward end and a rearward end. A spool is supported to the reel body forward end. The spool has an axis and a forward end and a rearward end.

Rotatably supported by the reel body is a means; for winding a line onto the spool in the form of a winding drum which is rotatably supported forwardly of and coaxially with the spool. The winding drum has a retractable line engaging means. When the line engaging means is extended and the winding drum rotated, line is wound onto the spool. When casting a bait or lure, the line engaging means is retracted, permitting the line to be freely wound off the spool and past the winding drum.

The winding drum is rotated to retrieve the line by means of a gearing mechanism and, in addition, the winding drum may be axially, forwardly advanced to achieve line stopping action.

In one embodiment, a line confining cone is supported to the reel forwardly of the spool and the winding drum or can encompass in whole or in part the spool and winding drum. The cone has a forward end and a rearward end and an opening through it. In a preferred arrangement, the opening through the cone is conical in basic geometry. The interior circumferential surface of the opening through the cone provides the line confining envelope.

A separate housing is secured to the reel and encompasses the spool, the winding drum, and the cone. The housing has an opening in the forward end thereof which is in register with the opening in the forward end of the speed cone to receive fishing line therethrough. In a preferred arrangement, the cone is secured at its forward end to the housing forward end as a means of supporting it to the reel body. The cone may be secured in a manner to be easily replaceable so that the characteristics of the reel may be altered by changing cones.

In an alternate embodiment of the invention the cone may be provided with a circumferential elastomeric member. This member may be in the form of a brake ring received in a circumferential recess in the cone. This elastomeric member is engageable by the winding drum when the winding drum is axially, forwardly advanced to trap the fishing line extending through the cone and over the drum, as a means of controlling the discharge of line from the reel.

The brake ring is recessed in the cone in such a way that the line does not touch the brake ring during casting or retrieving action, but the line is forced into contact with the brake ring by the winding drum when it is pushed forward to the stop position.

The improvements of this invention are directed to incorporating a separate line choke which is insertable and/or replaceable within the housing or the cone means, the line choke comprising a central opening of varying sizes and shapes to provide control over the casting distance of fishing line and attached lure and its velocity or speed.

A better understanding of the invention will be had by reference to the following description and claims, taken in conjunction with the attached drawings.

DESCRIPTION OF THE DRAWINGS

FIG. 1 is a sectional view of a closed face fishing reel of this invention which includes an outer housing and a line confining envelope or cone therein, which cone includes the line choke of this invention.

FIG. 2 is a sectional view of one type of line choke of the type shown in FIG. 1.

FIG. 3 is a front elevation of the choke of FIG. 2.

DETAILED DESCRIPTION OF THE PREFERRED EMBODIMENT

Figure 5:
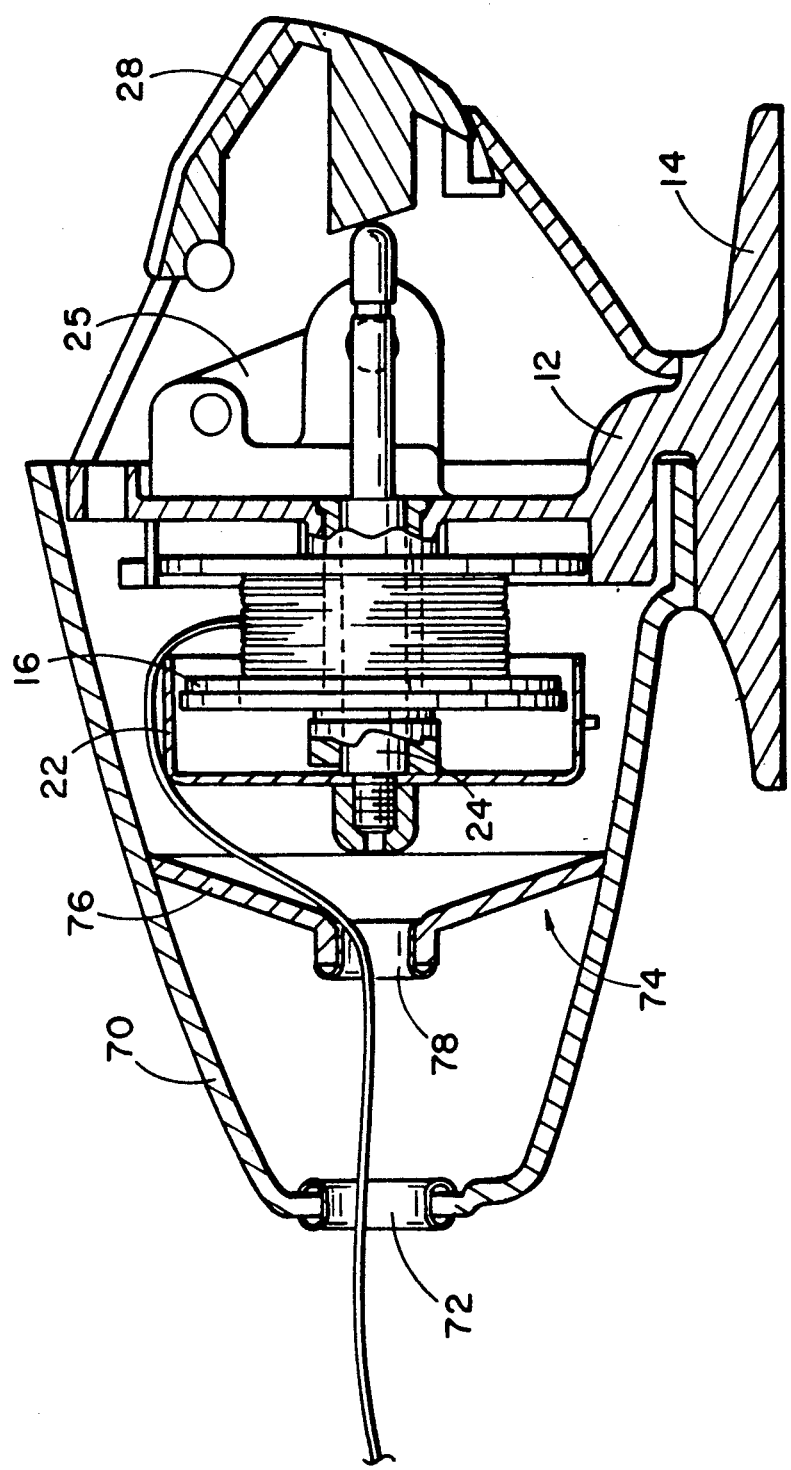
FIG. 5 is a sectional view of a closed face fishing reel into which the line choke of FIG. 4 has been positioned and locked in place within the reel housing.

Before explaining the present invention in detail, it is to be understood that the invention is not limited in its application to the details of the construction and arrangement of parts illustrated in the accompanying drawings. The invention is capable of other embodiments and of being practiced or carried out in a variety of ways. It is to be understood that the phraseology and terminology employed herein is for the purpose of description and not of limitation.

Referring to the drawings and first to FIG. 1, a reel embodying the principles of this invention is generally indicated by the numeral 10. The reel includes a body 12 having means such as extending flange portions 14 whereby the reel can be mounted on a fishing rod.

Attached to the body 12 is a spool 16 having an external surface 18 onto which fishing line 20 may be wound. Rotatably supported relative to the spool is a winding drum 22 secured to a shaft 24 by means of a gearing mechanism 25 attached to an external crank (not shown), by which the shaft 24 may be rotated to rotate the winding drum. Extendable from the winding drum is a line engaging means 26. When this line engaging means 26 is extended, as illustrated in FIG. 1, and the winding drum 22 is rotated, line 20 is wound on the spool 16. When the line engaging means 26 is retracted, line 20 may be freely extracted from the reel by passing over the circumferential surface of the winding drum.

In addition to provision for rotation of winding drum 22, means is also provided such as by thumb button 28 to axially advance the winding drum 22 to provide line stopping action.

Secured to the body 12 is a housing 30 which encompasses the mechanism of the reel, including the spool 16 winding drum 22, gearing mechanism 25 and the other internal components of the reel.

All of the elements described to this point; that is, elements 12-30, are typical of prior art closed face fishing reels. In these typical fishing reels, the housing 30 has an interior surface 32 which, in the forward portion thereof, provides a line confining envelope, that is, a boundary area within which line 20 is restricted as it is unwound from spool 16 passing circumferentially over the external surface of winding drum 22. In such prior art devices, the line confining envelope is thus define by the housing forward interior surface 32 which, therefore, limits the external configuration of the reel to that which is required for providing the desired line confining envelope geometry.

An essential element of the present invention is a line guide cone 34 which becomes the fishing line confining envelope. The cone may be formed of different materials, including metal, plastic or the like. A material which is compatible with the free movement of fishing line may be selected. The cone does not have to have the rigidity of a housing component. The cone has a forward end 36, a rearward end 38, and an opening 40 therethrough. In the embodiment illustrated in FIG. 1, the opening 39 conical, and such conical opening provides a prescribed line confining geometry.

The cone 34 is supported relative to the reel body 12. This is accomplished by supporting the cone to the forward end portion to the housing 30 and on to the reel body 12 or as a part of housing 30. Housing 30 is provided with an opening 42 therein at the forward end and opening 42 is coincident with the opening 40 at the forward end 36 of the speed cone. In the illustrated arrangement of FIG. 1, a circumferential clip 44 formed of metal or stiff plastic is employed to support speed cone 34 within the housing and thereby relative to the reel body 12.

The housing 30 may be configured in a variety of shapes and forms, separable either horizontally or vertically, as shown. The configuration of the line guide cone 34 may vary considerably, provided, however, there is an essentially conical interior surface 40.

An important aspect of this invention is the use of a removable, replaceable line choke identified generally by the numeral 50, which in this embodiment includes the conical rearward portion 52 and the forward cylindrical channel portion 54. The line choke includes an opening 56 which in this case includes a circumferential guide. The axis of the line choke is coaxial with the axis of the spool 16 and winding drum 22. In this embodiment the line choke 50 is retained within the guide cone by the frictional engagement of the conical portion 52 therewith but other forms of releasable attachment are inclusive of the invention. Incorporated within the guide cone, in this embodiment, is a winding drum brake area 46 which may include some form of elastomeric means to provide friction when the winding drum is moved axially forward into contact therewith and thus braking the flow of line 20 from the spool 16.

Figure 4:
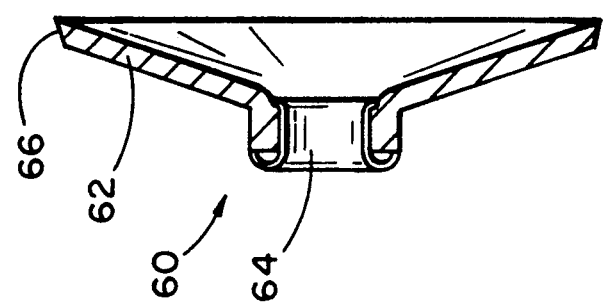
FIG. 4 is a section view of another type of line choke.

FIG. 4 is an alternate form of line choke generally designated by the numeral 60 which includes the conical portion 62 and axial opening 64 but does not include the cylindrical channel as in the embodiments of FIGS. 1, 2, and 3. Again, the line choke is removeably retained within the guide cone by the frictional engagement of the outer surface 66 with the internal surface of the guide cone.

FIG. 5 represents an alternate embodiment with like numbers for like parts of the reel as taken and shown in FIG. 1. In this embodiment, the housing 70 does not include an interior guide cone. That is, the interior of the housing becomes the equivalent guide cone surface. The outer housing is attached to the reel body 12 extending forwardly to an opening 72 that is coaxial with the axis of the spool 16 and winding drum 22. In this embodiment the removable and replaceable line choke, generally designated by the numeral 74, includes the conical portion 76 which is frictionally retained with the interior of the housing 70. A central opening 78 within the line choke 74 is coaxial with the opening 72.

Figure 6:
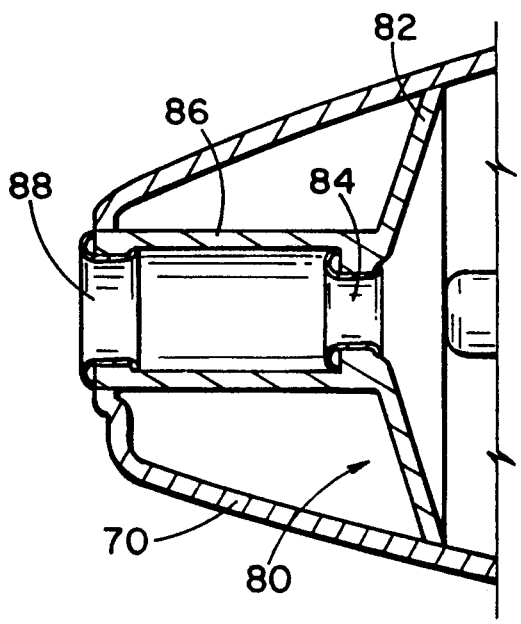
FIG. 6 is a partial sectional view of the front housing of the reel type of FIG. 5 showing a different type of line choke insert.

In the embodiment of FIG. 6, the line choke of this invention generally designated by the numeral 80 includes the conical portion 82, coaxial opening 84, and cylindrical guide channel 86 which in this embodiment includes sleeve 88.

Figure 7:
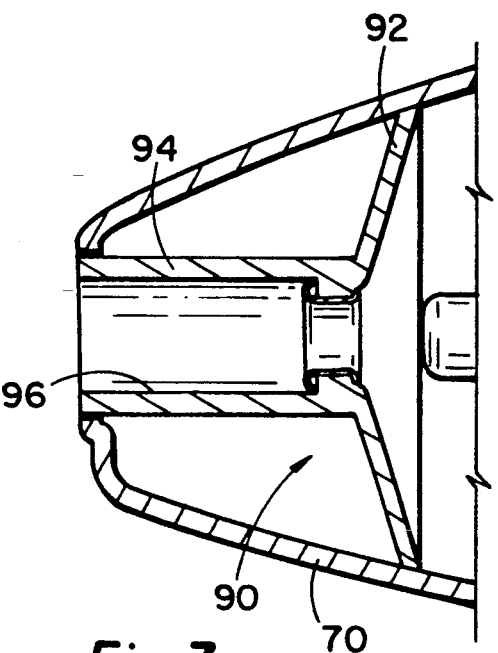
FIG. 7 is a partial sectional view of yet another line choke embodiment for the housing of a closed face fishing reel.

FIG. 7 is a yet further embodiment similar to that of FIG. 6 describing a line choke generally designated by the numeral 90 having a conical surface 92 which is frictionally or otherwise retained within the housing. Forwardly of the conical surface is a cylindrical channel 94. In this embodiment the cylindrical channel 94 has an interior opening 96 which increases in diameter in a forward direction.

Figure 8:
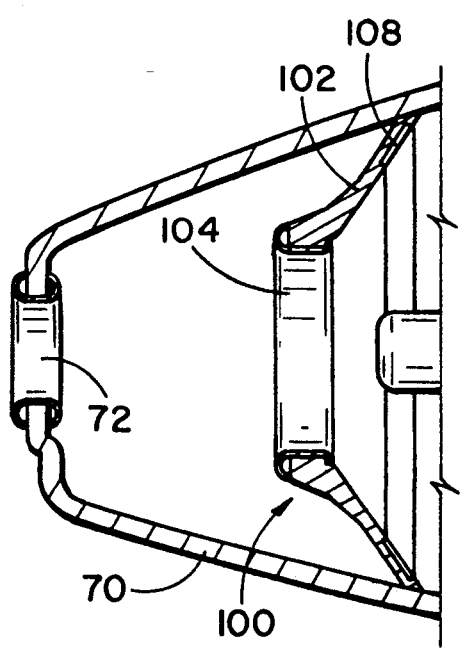
FIG. 8 is a partial sectional view of yet another form of line choke.

FIG. 8 is a yet further embodiment of the invention depicting a line choke generally designated by the numeral 100. In this embodiment the conical portion 102 of the choke 102 includes opening 104 which is larger in diameter than the front opening 72 of the reel housing. Also, this embodiment describes a portion of the cone facing the winding drum, not shown in this view, which is a brake area for stopping the flow of fishing line during the casting operation. The section 108 may be of an elastomeric material, e.g. O-ring.

Figure 9:
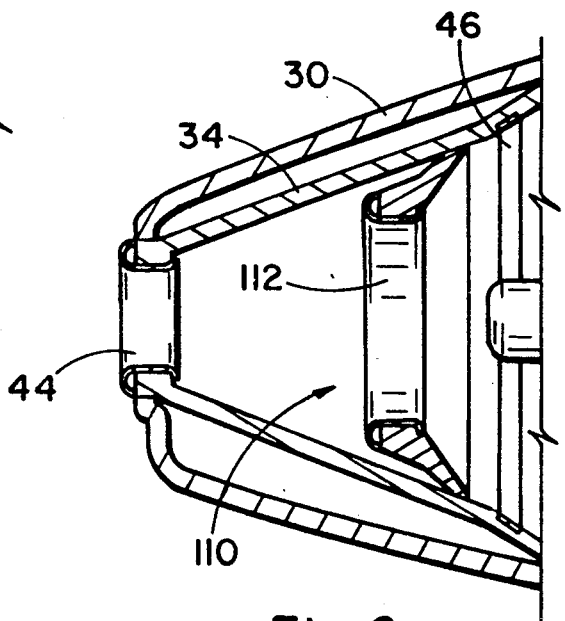
FIG. 9 is a depiction of the same choke of FIG. 8 only placed within the housing of the reel with a guide cone.

FIG. 9 depicts a further embodiment of the invention in combination with the guide cone as shown in FIGS. 1, 2, and 3, utilizing a line choke generally designated by the numeral 110 which includes an opening 112 which in this embodiment is larger than the opening 44.

What is claimed is:

1. A closed face fishing reel comprising:
   a reel body having a forward end and a rearward end;
   a spool supported to the reel body having a spool axis, a forward end and a rearward end;
   means for winding line onto said spool axis, such winding means being rotatably about a forward-rearward axis of said spool;
   a separate front housing removably supported relative to said body and encompassing said spool, said front housing having a forward opening therein co-axial with the axis of said spool;
   an insertable and replaceable line choke retained within the housing, the choke having an opening co-axially aligned with the axis of said spool and spaced between said winding means and said forward opening of said housing; and
   means for attaching said reel to a fishing rod.

2. A fishing reel of claim 1 wherein the diameter of the opening of said line choke is smaller that the diameter of said forward opening of said housing.

3. A fishing reel of claim 1 wherein the diameter of the opening of said line choke is larger than the diameter of said forward opening of said housing.

4. A fishing reel of claim 1 wherein said means for winding line unto said spool is axially advanced and wherein said line choke is engageable by said winding means.

5. A reel of claim 4 wherein said line choke has a circumferential elastomeric means for braking the outflow of fishing line, said elastomeric means being engageable by said winding means when said winding means is axially advanced.

6. A reel of claim 1 wherein said means for winding line unto said spool is axially advanced and wherein said housing has an elastomeric means thereon, said elastomeric means being engageable by said winding means when said winding means is axially advanced.

7. A closed face fishing reel comprising:
   a reel body having a forward end and a rearward end;
   a spool supported to the reel body having a spool axis, a forward end and a rearward end;
   means for winding line onto said spool, such winding means being rotatable about a forward-rearward axis of said spool;
   a separate housing removably supported relative to said body and encompassing said spool, the housing having a forward opening therein co-axial with the axis of said spool;
   a means for providing a line confining envelope within and distinct from said housing, said means having a forward end and a rearward end, and an opening co-axial with the axis of said spool through said forward end;
   an insertable and replaceable line choke retained within said line conforming envelope, said insertable and replaceable line choke comprising an opening coaxially aligned with the axis of said spool and spaced between said winding means and said forward opening of said housing; and
   means for attachment of said reel to a fishing rod.

8. A fishing reel of claim 7 wherein the diameter of the opening of said line choke is larger than the diameter of said forward opening of said housing.

9. A fishing reel of claim 7 wherein said means for winding line onto said spool is axially advanced and wherein said line choke is engageable by said winding means.

10. A reel of claim 9 wherein said line choke has a circumferential elastomeric means for braking the outflow of fishing line, said elastomeric means being engageable by said winding means when said winding means is axially advanced.

11. A reel of claim 7 wherein said means for winding line onto said spool is axially advanced and wherein said line confining envelope has an elastomeric means therein, said elastomeric means being engageable by said winding means when said winding means is axially advanced.

12. A closed face fishing reel as set forth in claim 2 wherein:
   said line choke includes a cylindrical channel between said choke opening and said forward opening of the housing.

13. A closed face fishing reel as set forth in claim 7 wherein:
   the diameter of the opening of said line choke is smaller that the diameter of said forward opening of said housing.

14. A closed face fishing reel as set forth in claim 7 wherein
   the diameter of the opening of said line choke means is equal to the diameter of the forward opening of said housing.

15. A closed face fishing reel comprising
   a reel body having a forward end and a rearward end;
   a spool supported to the reel body having a spool axis, a forward end and a rearward end;
   means for winding line onto said spool, such winding means being rotatably about a forward-rearward axis of said spool;
   a separate housing removably supported relative to said body and encompassing said spool, the housing having a forward opening therein in register with the axis of said spool;
   a line confining means within said housing, said means having a forward end and a rearward end, and an axial opening therethrough the said forward end;
   an insertable and replaceable line choke retained within the said line confining means, said insertable and replaceable line choke comprising an opening axially and rearwardly spaced from the forward opening of said housing;
   means for attachment of said reel to a fishing rod; and the diameter of the opening of said line choke means is equal to the diameter of the forward opening of said housing.

16. A closed face fishing reel comprising:

a reel body having a forward end and a rearward end;

a spool supported to the reel body having a spool axis, a forward end and a rearward end;

means for winding line onto said spool, such winding means being rotatably about a forward-rearward axis of said spool;

a separate front housing removably supported relative to said body and encompassing said spool, the housing having a forward opening therein in register with the axis of said spool;

an insertable and replaceable line choke retained within said front housing, said insertable and replaceable line choke comprising an opening axially and spaced between said winding means and said forward opening of said housing;

means for attachment of said reel to a fishing rod; and said line choke includes a cylindrical channel between said line choke opening and said forward opening of the housing.

* * * * *